(12) United States Patent
Maeda et al.

(10) Patent No.: US 11,740,098 B2
(45) Date of Patent: Aug. 29, 2023

(54) SYSTEM AND METHOD FOR PROVIDING CHARGING OPTIONS BASED ON ELECTRIC VEHICLE OPERATOR ACTIVITIES

(71) Applicant: Honda Motor Co., Ltd., Tokyo (JP)

(72) Inventors: Eri Izumi Maeda, Rancho Palos Verdes, CA (US); David Wong Cun, Fountain Valley, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 265 days.

(21) Appl. No.: 16/654,348

(22) Filed: Oct. 16, 2019

(65) Prior Publication Data

US 2021/0048302 A1 Feb. 18, 2021

Related U.S. Application Data

(60) Provisional application No. 62/886,895, filed on Aug. 14, 2019.

(51) Int. Cl.
*G01C 21/34* (2006.01)
*B60L 58/12* (2019.01)
(Continued)

(52) U.S. Cl.
CPC .......... *G01C 21/3476* (2013.01); *B60L 53/11* (2019.02); *B60L 53/305* (2019.02);
(Continued)

(58) Field of Classification Search
CPC ..... G01C 21/3476; G06F 9/451; B60L 53/68; B60L 53/62; B60L 53/11; B60L 53/64;
(Continued)

(56) References Cited

U.S. PATENT DOCUMENTS 8,417,401 B2 4/2013 Takahara et al.
8,615,355 B2 12/2013 Inbarajan et al.
(Continued)

FOREIGN PATENT DOCUMENTS

CN 108001282 5/2018
CN 108556661 9/2018
(Continued)

OTHER PUBLICATIONS

English Translation of JP2017116341A Title: Cruise Control Device Date: Jun. 29, 2017 Author: Isaji et al. (Year: 2017).*
(Continued)

*Primary Examiner* — James J Lee
*Assistant Examiner* — Steven Vu Nguyen
(74) *Attorney, Agent, or Firm* — Rankin, Hill & Clark LLP

(57) ABSTRACT

A system and method for providing charging options based on electric vehicle operator daily activities that include analyzing data associated with daily activities of an operator of an electric vehicle and determining at least one travel routine and at least one prospective travel plan that is completed by the operator of the electric vehicle based on the daily activities. The system and method also include determining a current geo-location of the electric vehicle. The system and method further include presenting an electric vehicle charging planner user interface that presents at least one prospective travel path to the at least one predicted point of interest.

20 Claims, 6 Drawing Sheets

(51) Int. Cl.
    *G06F 9/451*  (2018.01)
    *B60L 53/68*  (2019.01)
    *B60L 53/10*  (2019.01)
    *B60L 53/64*  (2019.01)
    *B60L 53/30*  (2019.01)
    *B60L 53/66*  (2019.01)
    *B60L 53/62*  (2019.01)

(52) U.S. Cl.
    CPC .............. *B60L 53/62* (2019.02); *B60L 53/64* (2019.02); *B60L 53/665* (2019.02); *B60L 53/68* (2019.02); *B60L 58/12* (2019.02); *G06F 9/451* (2018.02); *B60L 2240/60* (2013.01)

(58) Field of Classification Search
    CPC ...... B60L 58/12; B60L 53/305; B60L 53/665; B60L 2240/60
    See application file for complete search history.

(56) References Cited

U.S. PATENT DOCUMENTS

| | | | |
|---|---|---|---|
| 8,717,170 | B1 | 5/2014 | Juhasz |
| 8,963,494 | B2 | 2/2015 | Kishiyama et al. |
| 8,965,669 | B2 | 2/2015 | Fisher et al. |
| 9,056,553 | B2 | 6/2015 | Cun |
| 9,112,382 | B2 | 8/2015 | Paul et al. |
| 9,132,746 | B2 | 9/2015 | Enomoto et al. |
| 9,142,978 | B2 | 9/2015 | Juhasz |
| 9,177,306 | B2 | 11/2015 | Penilla et al. |
| 9,379,559 | B2 | 6/2016 | O'Connell et al. |
| 9,448,083 | B2 | 9/2016 | Loftus et al. |
| 9,459,114 | B2 | 10/2016 | Saito et al. |
| 9,545,853 | B1 | 1/2017 | Penilla et al. |
| 9,580,079 | B2 | 2/2017 | Long |
| 9,610,853 | B1 | 4/2017 | Miller et al. |
| 9,685,798 | B2 | 6/2017 | Appelbaum et al. |
| 9,709,988 | B2 | 7/2017 | Miller et al. |
| 9,739,624 | B2 | 8/2017 | Rajagopalan et al. |
| 9,744,871 | B2 | 8/2017 | Sabripour |
| 9,796,280 | B2 | 10/2017 | McCool et al. |
| 9,937,794 | B2 | 4/2018 | Bellin et al. |
| 10,101,397 | B2 | 10/2018 | Cooley et al. |
| 10,168,170 | B2 | 1/2019 | North et al. |
| 10,185,978 | B2 | 1/2019 | Khoo et al. |
| 10,369,974 | B2 | 8/2019 | Carlson et al. |
| 2008/0243330 | A1* | 10/2008 | Kato ................... G01C 21/343 701/29.5 |
| 2010/0094496 | A1 | 4/2010 | Hershkovitz et al. |
| 2011/0225105 | A1 | 9/2011 | Scholer et al. |
| 2012/0019204 | A1 | 1/2012 | Matsuo et al. |
| 2014/0021908 | A1 | 1/2014 | McCool et al. |
| 2014/0316939 | A1 | 10/2014 | Uyeki |
| 2015/0183333 | A1 | 7/2015 | Forbes, Jr. et al. |
| 2015/0202975 | A1 | 7/2015 | Solomon et al. |
| 2015/0294329 | A1 | 10/2015 | Saito et al. |
| 2016/0264011 | A1 | 9/2016 | Yasukawa et al. |
| 2016/0335377 | A1 | 11/2016 | Yamashina et al. |
| 2017/0010116 | A1* | 1/2017 | Inoue ..................... B60L 53/62 |
| 2017/0030728 | A1 | 2/2017 | Baglino et al. |
| 2017/0074671 | A1 | 3/2017 | Yoshimura et al. |
| 2017/0120758 | A1 | 5/2017 | Xu et al. |
| 2017/0168493 | A1 | 6/2017 | Miller et al. |
| 2018/0073882 | A1 | 3/2018 | North et al. |
| 2018/0158150 | A1 | 6/2018 | Li et al. |
| 2018/0260887 | A1 | 9/2018 | Takatsuka et al. |
| 2018/0340784 | A1* | 11/2018 | Upadhyay ............... F01N 9/002 |
| 2018/0370379 | A1 | 12/2018 | Chen et al. |
| 2019/0025068 | A1 | 1/2019 | Yoshino et al. |
| 2019/0143831 | A1 | 5/2019 | Birek et al. |
| 2019/0152335 | A1 | 5/2019 | Farber |
| 2019/0207398 | A1 | 7/2019 | Shih et al. |
| 2019/0285425 | A1 | 9/2019 | Ludwick et al. |
| 2020/0126123 | A1 | 4/2020 | Loriaux |
| 2020/0198658 | A1* | 6/2020 | Suzuki ................... B60R 16/02 |
| 2020/0254896 | A1 | 8/2020 | Lee et al. |
| 2020/0376972 | A1* | 12/2020 | Martin ................ H01M 16/006 |
| 2021/0049907 | A1* | 2/2021 | Dhillon .................. H04W 4/44 |

FOREIGN PATENT DOCUMENTS

| | | |
|---|---|---|
| CN | 109029477 | 12/2018 |
| CN | 106427635 | 3/2019 |
| CN | 109900288 | 6/2019 |
| CN | 109927566 | 6/2019 |
| CN | 106447129 | 8/2019 |
| DE | 102010064015 | 6/2012 |
| DE | 102017006944 | 3/2018 |
| EP | 2676832 | 12/2013 |
| FR | 2971874 | 8/2012 |
| JP | 2010230615 | 10/2010 |
| JP | 2011170686 | 9/2011 |
| JP | 5408002 | 2/2014 |
| JP | 2014106137 | 6/2014 |
| KR | 101845241 | 4/2018 |
| KR | 102046995 | 12/2019 |
| WO | WO2011104883 | 9/2011 |
| WO | WO2019126806 | 6/2019 |

OTHER PUBLICATIONS

English Translation of JP2017096769A Title: Action Plan Planning and Execution Support Device Date: Jun. 1, 2017 Author: Onimaru HiroYuki (Year: 2017).*
Office Action of U.S. Appl. No. 17/095,013 dated Aug. 25, 2021, 36 pages.
Office Action of U.S. Appl. No. 16/593,580 dated Mar. 29, 2022, 41 pages.
Office Action of U.S. Appl. No. 17/095,013 dated Jan. 28, 2022, 35 pages.
Office Action of U.S. Appl. No. 17/095,013 dated May 13, 2022, 44 pages.
Notice of Allowance of U.S. Appl. No. 16/665,717 dated May 5, 2022, 39 pages.
Office Action of U.S. Appl. No. 17/095,013 dated Aug. 12, 2022, 22 pages.
Office Action of U.S. Appl. No. 16/593,580 dated Dec. 22, 2022, 24 pages.
Office Action of U.S. Appl. No. 17/095,013 dated Dec. 9, 2022, 20 pages.
Office Action of U.S. Appl. No. 17/479,380 dated Jan. 3, 2023, 80 pages.
Office Action of U.S. Appl. No. 17/843,177 dated Dec. 22, 2022, 40 pages.
Office Action of U.S. Appl. No. 17/095,013 dated Feb. 17, 2023, 28 pages.
Office Action of U.S. Appl. No. 17/479,380 dated Apr. 21, 2023, 62 pages.
Office Action of U.S. Appl. No. 17/856,538 dated Mar. 27, 2023, 36 pages.

* cited by examiner

SYSTEM AND METHOD FOR PROVIDING CHARGING OPTIONS BASED ON ELECTRIC VEHICLE OPERATOR ACTIVITIES

CROSS-REFERENCE TO RELATED APPLICATION

This application claims priority to U.S. Provisional Application Ser. No. 62/886,895 filed on Aug. 14, 2019, which is expressly incorporated herein by reference.

BACKGROUND

Electric vehicles contain electric storage mechanisms (e.g., electric engines powered by rechargeable batteries) to store electricity and power the electric vehicles. The electric storage mechanisms may be replenished periodically by using, for example, charging equipment installed at a residential home or charging equipment installed at public or private charging stations. Operators of electric vehicles may be typically concerned about balancing charging efficiency and costs. In many cases, when operators connect their electric vehicles to charge, the electric vehicles may charge to a maximum state of charge at one or more charging speeds (e.g., 100% state of charge of the rechargeable batteries) regardless of the cost of energy during the charging session.

In many cases, operators may not be aware of additional or alternate locations at which charging may be completed at cheaper rates. In other cases, operators may arrive at a station and may not be able to charge their electric vehicle based on a backlog of additional customers that are charging their respective electric vehicles or are waiting in a queue to charge their respective electric vehicles. Additionally, operators may not be able to take advantage of cost savings with respect to charging stations, charge times, and/or additional charging resources that may be available to them and that may be utilized to balance electric vehicle charging efficiency and costs.

BRIEF DESCRIPTION

According to one aspect, a computer-implemented method for providing charging options based on electric vehicle operator daily activities that includes analyzing data associated with daily activities of an operator of an electric vehicle. The computer-implemented method also includes determining at least one travel routine and at least one prospective travel plan that is completed by the operator of the electric vehicle based on the daily activities and determining a current geo-location of the electric vehicle. The current geo-location of the electric vehicle, the at least one travel routine and the at least one prospective travel plan are analyzed to determine at least one predicted point of interest. The computer-implemented method further includes presenting an electric vehicle charging planner user interface that presents at least one prospective travel path to the at least one predicted point of interest. At least one charging station that is usable to charge the electric vehicle during the completion of the daily activities of the operator of the electric vehicle is presented through the electric vehicle charging planner user interface.

According to another aspect, a system for providing charging options based on electric vehicle operator daily activities that includes a memory storing instructions when executed by a processor cause the processor to analyze data associated with daily activities of an operator of an electric vehicle. The instructions also cause the processor to determine at least one travel routine and at least one prospective travel plan that is completed by the operator of the electric vehicle based on the daily activities and to determine a current geo-location of the electric vehicle, wherein the current geo-location of the electric vehicle. At least one travel routine and the at least one prospective travel plan are analyzed to determine at least one predicted point of interest. The instructions also cause the processor to present an electric vehicle charging planner user interface that presents at least one prospective travel path to the at least one predicted point of interest. At least one charging station that is usable to charge the electric vehicle during the completion of the daily activities of the operator of the electric vehicle is presented through the electric vehicle charging planner user interface.

According to still another aspect, a non-transitory computer readable storage medium storing instructions that when executed by a computer, which includes a processor perform a method that includes analyzing data associated with daily activities of an operator of an electric vehicle. The method also includes determining at least one travel routine and at least one prospective travel plan that is completed by the operator of the electric vehicle based on the daily activities and determining a current geo-location of the electric vehicle. The current geo-location of the electric vehicle, the at least one travel routine and the at least one prospective travel plan are analyzed to determine at least one predicted point of interest. The method further includes presenting an electric vehicle charging planner user interface that presents at least one prospective travel path to the at least one predicted point of interest. At least one charging station that is usable to charge the electric vehicle during the completion of the daily activities of the operator of the electric vehicle is presented through the electric vehicle charging planner user interface.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
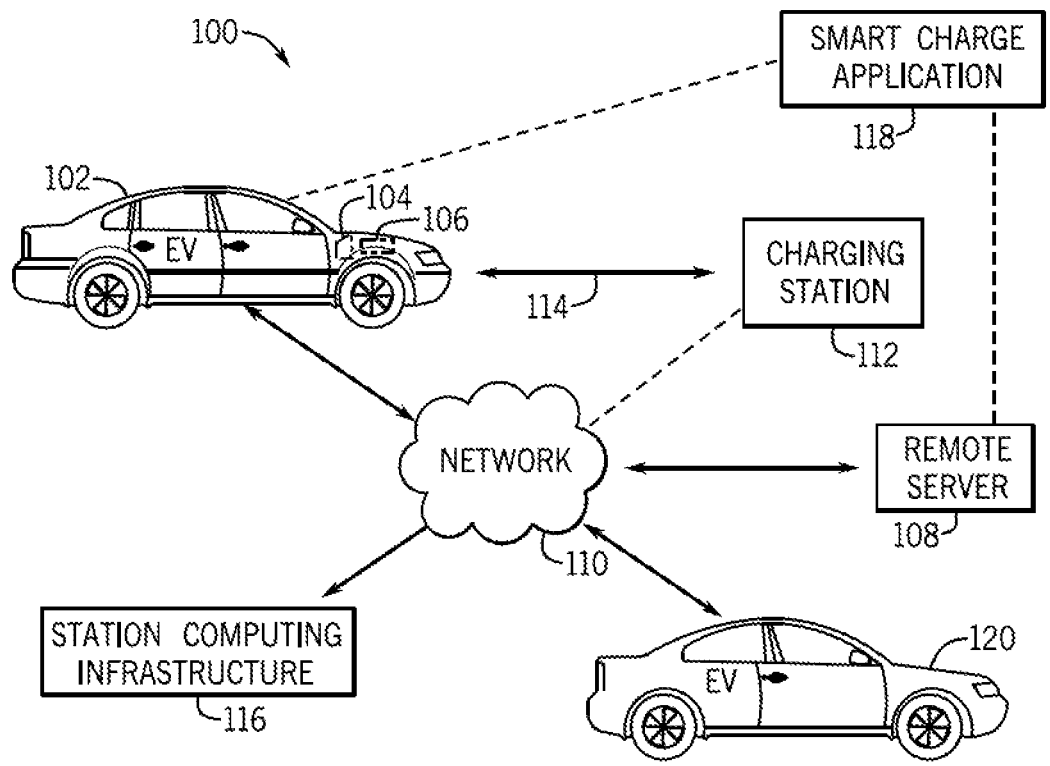
FIG. 1 is a high-level schematic view of an illustrative system for providing charging options based on electric vehicle operator activities according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview:

Referring now to the drawings, wherein the showings are for purposes of illustrating one or more exemplary embodiments and not for purposes of limiting same, FIG. 1 is a high-level schematic view of an illustrative system 100 for providing charging options based on electric vehicle operator activities according to an exemplary embodiment of the present disclosure. The components of the system 100, as well as the components of other systems and architectures discussed herein, may be combined, omitted or organized into different architectures for various embodiments.

In the exemplary embodiment of FIG. 1, the system 100 includes an electric vehicle (EV) 102 powered by an electric motor 104 and an electric storage mechanism, for example, a battery 106. In one embodiment, the EV 102 is purely electric in that it only has the electric motor 104. In other embodiments, the EV 102 may have the electric motor 104 and an internal combustion engine (not shown). In some embodiments, the EV 102 may have any number of electric motors, batteries, and/or internal combustion engines and they may operate in series (e.g., as in an extended range electric vehicle), in parallel, or some combination of series and parallel operation.

The EV 102 may be operably connected for computer communication to a remote server 108 via a wireless communication network 110. The EV 102 may transmit and receive data (e.g., state of charge data, energy cost data, charging commands/signals) to and from the remote server 108, and vice versa, through the network 110. The remote server 108 may be a remote computing system or a device remote (e.g., off-board) from the EV 102. The system architectures of the EV 102 and the remote server 108 will be discussed in more detail herein with reference to FIG. 2 and FIG. 3.

In the exemplary embodiment of FIG. 1, the system 100 may include one or more charging stations 112 that may connect to the EV 102 via a (respective) charging link 114. The charging station(s) 112 may include charging equipment (not shown) that may replenish the battery 106 of the EV 102 with charging power. Additionally, in some embodiments, the charging station(s) 112 may be operably connected for computer communication with the EV 102 and/or the remote server 108, for example, to transmit and receive data (e.g., charge parameters, charging data and feedback, vehicle system data) to and from the EV 102 and/or the remote server 108. The charging link 114 may be a wired or wireless link to the charging station(s) 112. Computer communication may occur also via the charging link 114 and/or a wired or wireless communication link. In one embodiment, the EV 102, the charging station(s) 112, and/or the charging link 114 may be operably controlled to initiate or terminate charging of the EV 102 from the charging station(s) 112 based on one or more charging schedules that are implemented within the system 100.

In one or more embodiments, the charging station(s) 112 may include charging equipment that may be installed at a residential home or outside a residential home, for example, at a public (e.g., non-networked) or private (e.g., networked) charging station(s). The charging station(s) 112 may include a charging station identification designation (e.g., identification number, serial number, alpha-numeric code, station name) that may be used to identify particular charging stations 112. The charging station(s) 112 may replenish the battery 106 using a charging energy source type that indicates the type of energy the charging station(s) 112 provides. Energy may include clean renewable energy and non-renewable energy. Clean renewable energy may include, solar energy, hydro energy, biomass energy, wind energy, among others. Non-renewable energy may include electricity from a grid source, and in the case of hybrid vehicles, fossil fuels.

In one or more embodiments, the EV 102 may be configured to output charging power to one or more additional electric vehicles 120 that may be physically linked via a vehicle to vehicle charging link (e.g., physical wired link, wireless link) (not shown) with the EV 102. The EV 102 may also be configured to receive charging power to charge the battery 106 of the EV 102 from one or more additional electric vehicles 120 that may be linked via the vehicle to vehicle charging link with the EV 102. Accordingly, the EV 102 and/or the one or more additional electric vehicles 120 may be configured to complete vehicle to vehicle wireless and/or wireline charging that may be completed in real-time without a current utilization of the charging station(s) 112.

In one or more configurations, the EV 102 may be configured of being capable of being fast charged based on fast charging components (not shown) that may be operably connected to the battery 106 and/or that may be included as part of the battery 106. Fast charging may enable the EV 102 to be charged at a faster charging speed (e.g., than a default charging speed) when being charged by a fast charging electric charging equipment (not shown) that may be included at the charging station(s) 112.

In particular, fast charging may provide a higher charging voltage from a default/conventional charging voltage (e.g., increase from 240 volts to 480 volts) to more quickly charge the battery 106 of the EV 102. Accordingly, during utilization of fast charging the battery 106 of the EV 102 may be more quickly charged to a particular state of charge level than during the utilization of a conventional electric vehicle charging speed. The charging station(s) 112 may thereby provide a particular charging rate structure that may pertain to the utilization of the conventional electric vehicle charging speed. Additionally, the charging station(s) 112 may provide a particular charging rate structure that may pertain to the utilization of the fast electric vehicle charging speed.

In an exemplary embodiment, the EV 102, the charging station(s) 112, the additional electric vehicles 120, and/or the remote server 108 may receive and transmit data through the network 110 to a charging station computing infrastructure 116 (station computing infrastructure). The station computing infrastructure 116 may include one or more computing devices (not shown) that may communicate with one or more charging station business entities (e.g., charging station corporate owner) that may include utility providers, fuel providers, and/or entities that own and/or operate one or more various types of charging stations, fuel stations, energy stations, and the like.

In one embodiment, the station computing infrastructure 116 may receive prospective and/or real-time price data that may be provided by each respective charging station(s) 112 to communicate different charging rates. The prospective and/or real-time price data may include charging rates during a certain period of time (e.g., hourly, daily, weekly), charging rates to charge the EV 102 at various charging speeds (e.g., conventional electric vehicle charging speed, fast electric vehicle charging speed, charging power levels), charging rates that may be based on a customer rating that may be applied to an operator of the EV 102, and/or charging rates that may be applied to an operator of the EV 102 based on one or more incentives, discounts, and/or credits that may be provided.

In some embodiments, the station computing infrastructure 116 may determine a price per kilowatt-hour of energy (price per kWh) that may be communicated to the EV 102, the remote server 108, and/or the charging station(s) 112 based on utility rates that are received from the one or more energy providers. The price per kWh may include a dynamic value that may change over time based on a time of day, a season, a region, a time zone, etc. For example, each hour of a particular day may include a different price per kWh based on one or more pricing schemes that are implemented by the one or more energy providers.

In an exemplary embodiment, the system 100 may include a smart charge application 118 that may provide various types of enhancements that may be applicable to the charging of the EV 102 and additional electric vehicles. In an exemplary embodiment, the smart charge application 118 may be executed by the EV 102 (e.g., a processor, an electronic control unit) and/or the remote server 108 (e.g., a processor). The smart charge application 118 may include various modules and/or logic (not shown) to provide enhancements to the electric vehicle charging systems from the perspective of the operator of the EV 102, as discussed below.

In particular, the smart charge application 118 may be configured to provide one or more user interfaces to the operator of the EV 102 (and operators of additional electric vehicles 120) that may allow the operator to determine one or more charging stations 112 and/or one or more additional electric vehicles 120 that may be utilized to charge the EV 102 during one or more activities of the operator of the EV 102. In other words, the smart charge application 118 may provide planning functionality that may take into account electric vehicle charging requirements and/or preferences with respect to the EV 102 in addition to daily routines, tasks, and/or activities of the operator of the EV 102. This functionality may provide the operator with information related to one or more charging stations 112 and/or one or more additional electric vehicles 120 that may be utilized to charge the EV 102 that may provide the operator charging options to charge the EV 102 that may take place in the midst of the operator's daily routines, tasks, and/or activities.

In particular, the smart charge application 118 may allow the operator of the EV 102 to provide one or more user interfaces to the operator of the EV 102 to visually determine one or more charging stations 112 and/or one or more additional electric vehicles 120 that may be located within a predetermined or dynamic distance of a current geo-location of the EV 102 and/or a predicted geo-location of the EV 102. The smart charge application 118 may additionally provide information associated with the one or more charging stations 112 that may include, but may not be limited to, charging rates, charging infrastructure, charging queues/wait times, and/or pricing incentives. The smart charge application 118 may also provide information pertaining to one or more additional electric vehicles 120 that may include, but may not be limited to, charging rates, charging infrastructure, and/or prospective geo-locations of the one or more additional electric vehicles 120.

Figure 2:
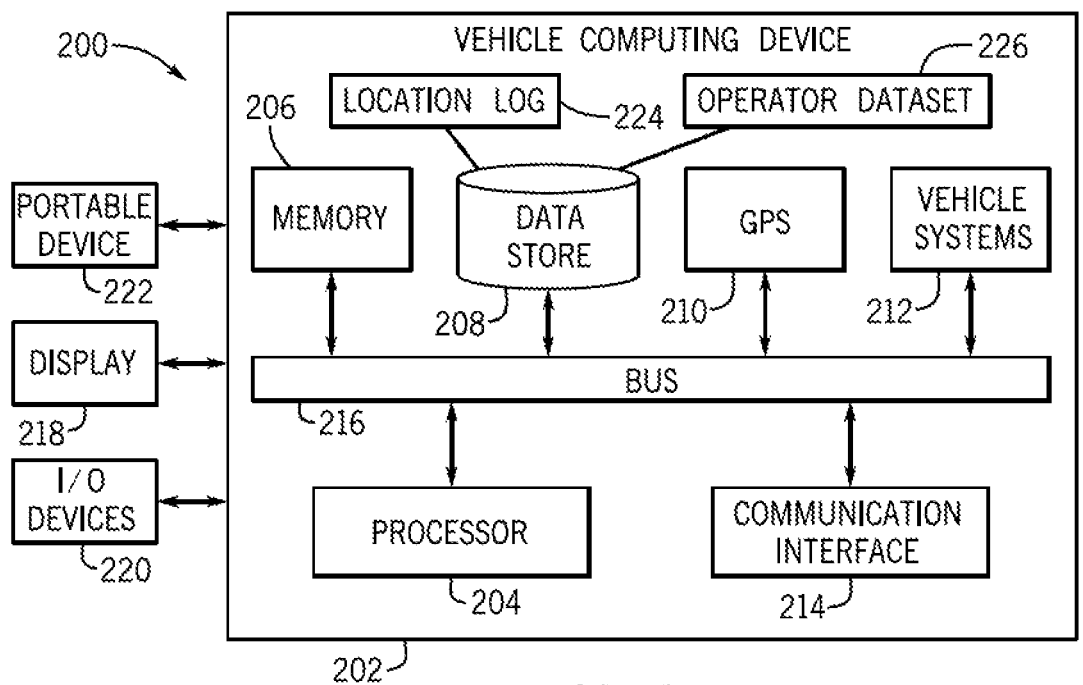
FIG. 2 is a schematic view of an illustrative electric vehicle architecture according to an exemplary embodiment of the present disclosure.

Referring now to FIG. 2, a schematic view of an illustrative electric vehicle architecture 200, for example the EV 102 of FIG. 1, is shown according to an exemplary embodiment. In particular, the EV 102 may include a vehicle computing device 202 (e.g., a telematics unit, an electronic control unit) with provisions for processing, communicating and interacting with various components of the EV 102 and other components of the system 100. The vehicle computing device 202 may include a processor 204, a memory 206, a data store 208, a position determination device 210 (GPS), a plurality of vehicle systems 212 (e.g., including the electric motor 104, the battery 106) and a communication interface 214. The components of the architecture 200, including the vehicle computing device 202, may be operably connected for computer communication via a bus 216 (e.g., a Controller Area Network (CAN) or a Local Interconnect Network (LIN) protocol bus) and/or other wired and wireless technologies. The vehicle computing device 202 as well as the EV 102 may include other components and systems not shown.

The data store 208 may be configured to store data files associated with one or more applications, operating systems, vehicle systems, subsystem user interfaces, including but not limited to data files of the smart charge application 118. In one embodiment, the data store 208 of the EV 102 may include a location log 224 that may optionally (e.g., based on user approval) keep a log of locations at which the EV 102 is driven, parked, and/or charged and/or the operator visits at one or more points in time during one or more periods of time. In particular, the smart charge application 118 may be configured to determine the current geo-location of the EV 102 at one or more points in time based on location data that is communicated by the GPS 210. The smart charge application 118 may thereby be configured to store the current geo-locations of the EV 102 at one or more points in time during one or more periods of time upon the location log 224.

In another embodiment, the smart charge application 118 may communicate with a portable device 222 that may be used by the operator of the EV 102. The portable device 222 may include a GPS sensor (not shown) that may determine the current geo-location of the portable device 222 at one or more points in time. The smart charge application 118 may be configured to provide a user interface input(s) through a display (not shown) of the portable device 222 to allow the operator to enable location sharing communications from the GPS sensor of the portable device 222 to the smart charge application 118. Accordingly, the portable device 222 may communicate one or more current geo-locations of the portable device 222 to the smart charge application 118 at one or more points in time. Upon receiving the current geo-location(s) of the portable device 222, the smart charge application 118 may be configured to store the current geo-locations of the portable device 222 at one or more points in time for one or more periods of time upon the location log 224.

As discussed below, the location log 224 may be analyzed by the smart charge application 118 with respect to the one or more stored geo-locations of the EV 102 and/or the one or more stored geo-locations of the portable device 222. In particular, the one or more stored geo-locations of the EV 102 and/or the one or more stored geo-locations of the portable device 222 may be compared to location data that may be provided by the station computing infrastructure 116 and stored on the remote server 108 to determine one or more travel routines that may apply to the operator of the EV 102.

In one embodiment, the data store 208 may additionally store an operator dataset 226 that may be utilized to store the one or more predicted point of interests that may be predicted as potential destinations of the operator of the EV 102 at one or more timeframes. The operator dataset 226 may additionally be populated with one or more data points that may be determined based on data that is received from the portable device 222 that may be used by the operator of the EV 102. In particular, the portable device 222 may be configured to execute one or more applications that may include, but may not be limited to, task list applications, calendaring applications, e-mail applications, restaurant reservation applications, vendor reservation applications, travel reservation applications, shopping list applications, personal assistant applications, and the like.

The smart charge application 118 may be configured to provide a user interface input(s) through a display (not shown) of the portable device 222 to allow the operator to link one or more of the aforementioned applications to the smart charge application 118. Accordingly, respective data pertaining to the tasks, scheduled calendar events, restaurant reservations, travel reservations, vendor reservations, shopping lists, and additional data that may be associated with the daily activities of the operator may be communicated to the smart charge application 118. Upon receiving such data, the smart charge application 118 may store respective data within the operator dataset 226. As discussed below, such data may be analyzed by the application 118 to determine one or more travel routines that may apply to the operator of the EV 102.

With continued reference to FIG. 2, the communication interface 214 of the EV 102 may provide software, firmware and/or hardware to facilitate data input and output between the components of the vehicle computing device 202 and other components, networks and data sources. Further, the communication interface 214 may facilitate communication with a display 218 (e.g., head unit display, head up display, dash board display) in the EV 102 and other input/output devices 220, for example, the portable device 222 (e.g., key fob, smart phone) connected to the EV 102.

In some embodiments the portable device 222 may include some or all of the components and functionality of the vehicle computing device 202. Additionally, the communication interface 214 may facilitate communication between the EV 102 and the portable device 222 that may include the display and/or input/output devices that may be used to operate various functions of the EV 102 and/or the smart charge application 118. In one embodiment, the display 218 of the EV 102 and/or the portable device 222 (e.g., through a display screen of the portable device 222) may be utilized to provide one or more user interfaces that may be included as a human machine interface(s) of the smart charge application 118.

Figure 3:
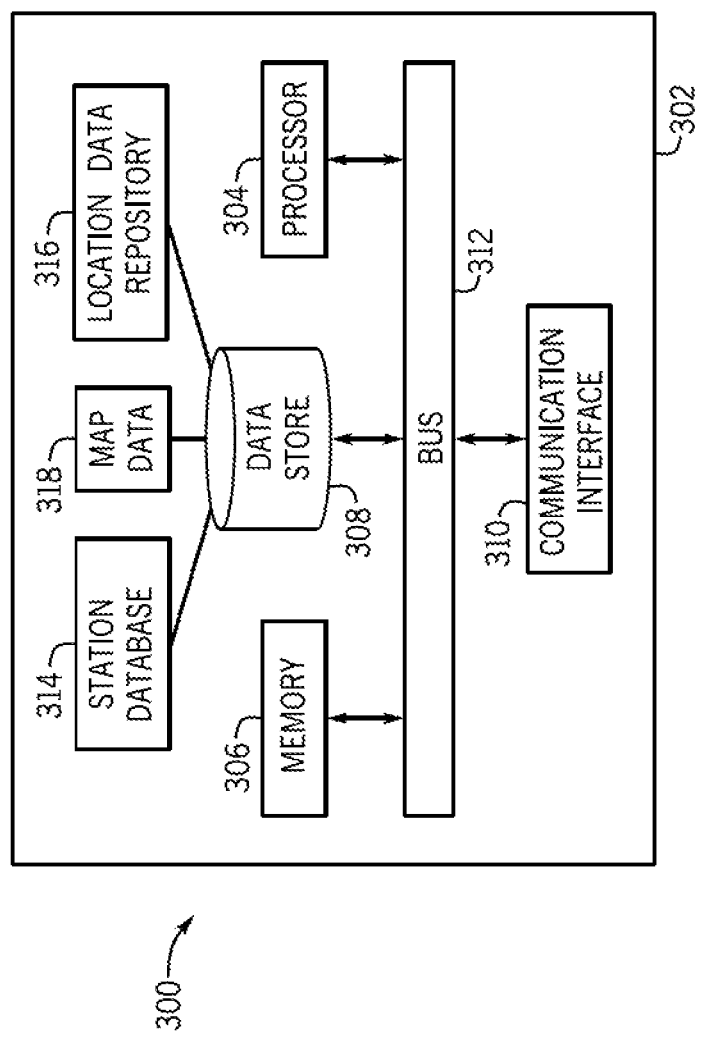
FIG. 3 is a schematic view of an illustrative remote server architecture according to an exemplary embodiment of the present disclosure.

Referring now to FIG. 3, a schematic view of an illustrative remote server architecture 300, for example the remote server 108 of FIG. 1, is shown according to an exemplary embodiment. The remote server 108, is located remotely (i.e., off-board) from the EV 102 (as shown in FIG. 1). In some embodiments, the remote server 108 may be maintained by a charging station entity, an Original Equipment Manufacturer (OEM) (e.g., of the EV 102), a utility provider, a regulatory body, among others. In additional embodiments, the remote server 108 may be another type of remote device or supported by a cloud architecture.

In FIG. 3, the remote server 108 may include a computing device 302 that may further include a processor 304, a memory 306, a data store 308 and a communication interface 310. The components of the architecture 300, including the computing device 302, may be operably connected for computer communication via a bus 312 and/or other wired and wireless technologies. The computing device 302 as well as the remote server 108 may include other components and systems not shown.

The data store 308 may be configured to store data files associated with one or more applications, operating systems, vehicle systems, subsystem user interfaces, including but not limited to data files of the smart charge application 118. In one configuration, the data store 308 of the remote server 108 may include a station database 314 that may include respective records of charging stations 112 that may be owned and/or operated by one or more charging station entities. The station database 314 may include records that each pertain to particular charging stations 112 that include data that may be pre-updated and/or updated in real-time by one or more charging station entities. In one configuration, the station database 314 may include records that may pertain to particular charging stations 112 and their respective geo-locations (GPS/DGPS coordinates of the charging station(s) 112). Each record may be identified based on the charging station identification designation (e.g., identification number, serial number, alpha-numeric code, station name) that may be used to identify one or more respective charging stations 112.

The station database 314 may also include records that may pertain to one or more particular charging stations 112 and one or more pricing schemes that may be implemented by the respective charging stations 112. The one or more pricing schemes may include a price per kWh that may include a dynamic value that may change over time based on a time of day, a season, a region, a time zone, charging power requirements, a charging speed, charging queue place, customer incentives, etc. For example, each hour of a particular day may include a different price per kWh based on one or more pricing schemes that are implemented by the one or more energy providers.

Additionally, the one or more pricing schemes may include price per kWh that may be influenced based on a customer rating associated with a respective operator and/or additional factors including, but not limited to, purchase of goods and/or services from the charging station entity and/or additional retailers/service providers. In some embodiments, the station database 314 may also include records that pertain to particular charging stations 112 and current utilization of the charging stations 112. The current utilization of the charging stations 112 may pertain to wait times that may be applicable with respect to the charging of the EV 102. As discussed below, the smart charge application 118 may access such data to be analyzed to provide the operator charging options to charge the EV 102 that may take place in the midst of the operator's daily routines, tasks, and/or activities.

In another embodiment, the station database 314 may include records that may pertain to one or more additional electric vehicles 120 that may be configured to provide charging power to charge the battery 106 of the EV 102 and/or may be charged by the EV 102. As discussed above, the EV 102 and/or the one or more additional electric vehicles 120 may be configured to complete vehicle to vehicle wireless and/or wireline charging that may be completed in real-time without a current utilization of the charging station(s) 112. In one configuration, the communication interface 214 may be utilized by the smart charge application 118 to communicate with a communication device (not shown) of one or more of the additional electric vehicles 120 to determine the current geo-locations of the respective additional electric vehicles 102, one or more pre-determined destinations (e.g., navigation system inputted destination) of the respective additional electric vehicles 102, a current SOC of the respective additional electric vehicles 102, and/or additional details associated with the respective additional electric vehicles 102. Upon receiving such data, the smart charge application 118 may be configured to populate such data within the respective record(s) of the station database 314 that may pertain to the respective additional electric vehicle(s) 120. As discussed below, the smart charge application 118 may access such data to be analyzed to provide the operator charging options to charge the EV 102 that may take place in the midst of the operator's daily routines, tasks, and/or activities.

In one or more embodiments, the data store 308 may additionally be configured to store a location data repository 316. The location data repository 316 may be configured as a relational database/data store that may include various records that may each include stored data that pertains to one or more particular point of interest locations (e.g., stores, restaurants, schools, home, etc.) and associated geo-location coordinates of the one or more particular point of interest locations. Each record of the location data repository 316 may be updated with a description of point of interest locations that may include names, maps, sub-points of interest names, sub-location names, and the like. Each record of the location data repository 316 may be updated based on data that is provided by the OEM of the EV 102, the station computing infrastructure 116, and/or one or more third party entities that may include, but may not be limited to application program developers, navigational application program interfaces providers, search engine developers/providers, reservation applications developers/providers, user review application developers/providers, and the like.

In one or more embodiments, the location data repository 316 may be updated in real-time to provide geo-locational coordinates associated with one or point of interest locations (e.g., current point of interest location of the EV 102), point of interest data associated with sub-point of interest locations located at the point of interest locations, location data associated with sub-locations located at the point of interest locations, maps of one or more areas of the point of interest locations, and associated data that may pertain to one or more particular areas located at the point of interest locations. As discussed below, the smart charge application 118 may be configured to analyze one or more geo-locations of the EV 102, one or more geo-locations of the portable device 222, and/or one or more geo-locations of one or more additional electric vehicles 120 to provide charging options to charge the EV 102 that may take place in the midst of the operator's daily routines, tasks, and/or activities.

In one embodiment, the data store 308 may also be configured to store map data 318 that may be accessed by the smart charge application 118. The map data may be continually updated based on a computer communication between the remote server 108 and one or more external systems including but not limited to, an external server computing infrastructure that may be owned and/or operated by a navigation map data provider, the OEM of the EV 102, and/or one or more third party entities that may include, but may not be limited to, application program developers, navigational application program interfaces providers, search engine developers/providers, reservation applications developers/providers, user review application developers/providers, and the like.

The map data may include data that pertains to geographical maps and satellite/aerial imagery of one or more locations at which the EV 102 may be located or may prospectively be located as predicted at one or more future points in time. In one or more embodiments, the location sensors 136 may be configured to determine a current geo-location of the portable device 222 and may output the current geo-location as current geo-locational coordinates (e.g., GPS/DGPS coordinates) of the portable device 222 to the smart charge application 118. In one embodiment, the map data 318 may be accessed by the smart charge application 118 to determine one or more travel routes (e.g., roads, streets, highways, etc.) that may be utilized by the EV 102 to reach one or more destinations, charging stations 112, and/or one or more additional electric vehicles 120.

In one configuration, the communication interface 310 may provide software, firmware and/or hardware to facilitate data input and output between the components of the computing device 302 and other components, networks and data sources. In some embodiments, the communication interface 310 may be used to communicate with the EV 102, the charging station(s) 112, the portable device 222, additional electric vehicles 120, and/or other components of system 100 and architecture 200.

II. The Smart Charge Application and Related Methods

The smart charge application 118 and its components will now be discussed in more detail according to an exemplary embodiment and with continued reference to FIGS. 1-3. In one or more embodiments, the smart charge application 118 may be executed by the vehicle computing device 202 of the EV 102 and/or the computing device 302 of the remote server 108. In an alternate embodiment, the smart charge application 118 may be executed by a processor (not shown) of the portable device 222 that may be used by the operator of the EV 102.

In one or more configurations, data may be sent or received from the smart charge application 118 to the components of the EV 102, the remote server 108, the charging station(s) 112, the charging link 114, the portable device 222, and/or the additional electric vehicles 120. For example, commands from the smart charge application 118 may be sent to the charging station(s) 112 and/or the charging link 114 to initiate or terminate charging of the EV 102 during one or more periods of time based on the one or more factors and/or the one or more charging schedules.

In an exemplary embodiment, the smart charge application 118 may include one or more user input interfaces and/or input means (e.g., buttons) that may be presented via the display 218, presented via the portable device 222, and/or included within the EV 102 and/or on the portable device 222. In one embodiment, the one or more user input interfaces and/or input means may include user interface inputs that may be utilized by an individual (e.g., the operator of the EV 102) to enable or disable the presentation of one or more user interface graphics that may be presented by the smart charge application 118. Additionally, the one or more user input interfaces and/or input means may include user interface inputs that may be utilized by an individual to enable or disable one or more smart charging functions provided by the smart charge application 118.

As discussed above, the smart charge application 118 may be configured to provide one or more user interfaces to the operator of the EV 102 (and operators of additional electric vehicles) that may allow the operator to visually compare charging rates, charging infrastructure, charging queues, and/or additional charging related information that may pertain to various charging stations 112 that may be located within a particular vicinity of a current (e.g., real-time) geo-location of the EV 102, a prospective (e.g., predicted) geo-location(s) of the EV 102, and/or a dynamically based determined geo-location(s) that may be based on one or more factors associated with the EV 102. Accordingly, the smart charge application 118 may provide planning functionality that may take into account electric vehicle charging requirements and/or preferences with respect to the EV 102 in addition to daily routines, tasks, and/or activities of the operator of the EV 102. This functionality may provide the operator with information related to one or more charging stations 112 and/or one or more additional electric vehicles 120 that may be utilized to charge the EV 102 and may provide the operator charging options to charge the EV 102 that may take place in the midst of the operator's daily routines, tasks, and/or activities.

Figure 4:
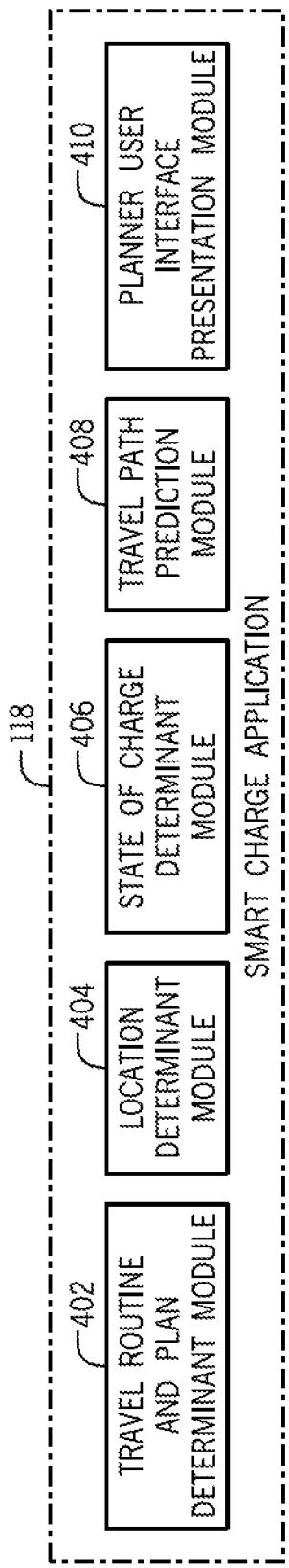
FIG. 4 is a schematic view of a plurality of modules of a smart charge application that may execute computer-implemented instructions for presenting electric vehicle charging options according to an exemplary embodiment of the present disclosure.

FIG. 4 is a schematic view of a plurality of modules 402-410 of a smart charge application 118 that may execute computer-implemented instructions for presenting electric vehicle charging options according to an exemplary embodiment of the present disclosure. In an exemplary embodiment, the plurality of modules 402-410 may include a travel routine and plan determinant module (travel plan module) 402, a location determinant module 404, a state of charge determinant module (SOC determinant module) 406, a travel path determinant module (travel path module) 408, and a planner user interface presentation module (planner presentation module) 410. It is appreciated that the smart charge application 118 may include one or more additional modules and/or sub-modules that are included in lieu of the modules 402-410.

In an exemplary embodiment, the travel plan module 402 may determine one or more travel routines and/or one or more prospective travel plans of the operator of the EV 102. The travel routines and/or prospective travel plans may be applicable at one or more points of time during one or more periods of time. In one embodiment, the travel plan module 402 may be configured to determine one or more travel routines that may be followed by the operator of the EV 102. The one or more travel routines may include one or more trips of the EV 102, tasks, and/or activities of the operator of the EV 102 that may routinely take place during a particular day, particular week, and/or one or more particular timeframes.

In particular, the travel plan module 402 may be configured to access the location log 224 that may be stored on the data store 208 of the vehicle computing device 202. Upon accessing the location log 224, the travel plan module 402 may be configured to analyze the log of locations at which the EV 102 is driven, parked, and/or charged. In one configuration, the travel plan module 402 may analyze the location log 224 to determine one or more point of interest locations that may be frequently and/or routinely traveled to by the EV 102. In particular, the travel plan module 402 may analyze point of interest data that may be stored on the data store 208 of the vehicle computing device 202 and/or the data store 308 of the remote server 108 to determine one or more points of interest locations that may be frequently and/or routinely traveled to by the EV 102.

Upon analyzing the location log 224, the travel plan module 402 may be configured to determine one or more travel routines that may be followed by the operator of the EV 102. In some configurations, the one or more travel routines may be analyzed through a neural network (not shown) to provide computer/machine based/deep learning techniques to determine whether a particular trip of the EV 102 that may be determined based on a current geo-location of the EV 102 is a routine trip or non-routine trip. This determination may be based on the analysis of data provided by the GPS 210. In an exemplary embodiment, upon determining one or more travel routines of the operator of the EV 102, the travel plan module 402 may be configured to communicate the one or more travel routines to the travel path module 408 of the smart charge application 118.

In another embodiment, the travel plan module 402 may be configured to access the operator dataset 226 to determine one or more prospective travel plans of the operator of the EV 102 based on one or more applications that may be executed on the portable device 222 used by the operator of the EV 102. As discussed above, the operator dataset 226 stored upon the data store 208 of the vehicle computing device 202 may be populated with one or more data points that may be determined based on data that is received from the portable device 222. In particular, the portable device 222 may be configured to execute one or more applications that may include, but may not be limited to, task list applications, calendaring applications, e-mail applications, restaurant reservation applications, vendor reservation applications, travel reservation applications, shopping list applications, personal assistant applications, and the like.

The travel plan module 402 may be configured to analyze the one or more data points that may be determined based on the data that is received and populated from such applications and may be configured to determine one or more prospective travel plans that may be followed by the operator of the EV 102 that may be based on task lists, vendor reservations, travel reservations, shopping lists, notes, and the like. In an exemplary embodiment, upon determining one or more prospective travel plans of the operator of the EV 102, the travel plan module 402 may be configured to communicate the one or more prospective travel plans to the travel path module 408 of the smart charge application 118.

In one or more configurations, the location determinant module 404 of the smart charge application 118 may be configured to determine the current geo-location of the EV 102 (e.g., current GPS/DGPS coordinates of the EV 102). In particular, the location determinant module 404 may be configured to communicate with the GPS 210 of the EV 102 to determine the current geo-location of the EV 102 at one or more points in time. In some embodiments, the location determinant module 404 may be configured to store the one or more geo-locations of the EV 102 determined at one or more points in time within the data store 208 of the vehicle computing device 202 and/or the data store 308 of the remote server 108.

In one configuration, the location determinant module 404 may utilize the communication interface 214 to communicate with a communication device of one or more of the additional electric vehicles 120 to determine the current geo-locations of the respective additional electric vehicles 102, one or more pre-determined destinations (e.g., navigation system inputted destination) of the respective additional electric vehicles 102, and/or additional details associated with the respective additional electric vehicles 102. Upon determining the current geo-location of the EV 102 and the current geo-locations of one or more of the additional electric vehicles 120, the location determinant module 404 may communicate respective data to the travel path module 408 of the smart charge application 118.

In an exemplary embodiment, the SOC determinant module 406 may be configured to determine a current state of charge (SOC) (e.g., charging level) of the battery 106 of the EV 102. In one configuration, the SOC determinant module 406 may be configured to communicate with the processor 204 of the vehicle computing device 202 to determine the current SOC of the battery 106 of the EV 102. In one embodiment, the processor 204 may be configured to communicate with a micro-processor (not shown) that may be included as part of electrical circuitry of the battery 106 to determine a current SOC of the battery 106.

In another embodiment, the SOC determinant module 406 may be configured to determine the SOC of the battery 106 of the EV 102 at one or more points in time based on communication with the processor 204 of the vehicle computing device 202 of the EV 102. The SOC determinant module 406 may be additionally configured to analyze the current geo-location of the EV 102 and determine a remaining distance that the EV 102 is capable of traveling. The remaining distance may be determined based on analyzing the current SOC of the battery 106, an average speed of the EV 102, and/or one or more road types (e.g., local, highway, road grades) that may be located within a vicinity of the current geo-location of the EV 102. Upon determining the current SOC and remaining distance that the EV 102 may travel at the average speed of the EV 102, the SOC determinant module 406 may communicate respective data to the travel path module 408.

In one embodiment, the travel path module 408 may analyze the current geo-location of the EV 102 at one or more points in time with respect a particular timeframe of utilization of the EV 102 in addition to the current SOC and remaining distance that the EV 102 may travel at the average speed of the EV 102. Additionally, the travel path module 408 may analyze one or more routine trips, and/or one or more prospective travel plans as determined by the travel plan module 402. The travel path module 408 may thereby predict one or more points of interest as potential destinations of the operator of the EV 102 during the course of one or more particular timeframes (e.g., days, hours).

The one or more predicted points of interest may be based on a particular timeframe(s) of use of the EV 102, the current geo-location of the EV 102, the current SOC of the EV 102, the remaining distance that the EV 102 may travel at the average speed of the EV 102. Additionally, the one or more predicted points of interest may be predicted as potential destinations of the EV 102 based on analysis of the one or more travel routines and/or the one or more prospective travel plans as determined by the travel plan module 402. The one or more predicted points of interest may include, but may not be limited to, a store, a restaurant, a home location, a workplace location, a location to complete a task, a location to shop for an item(s), a school, and the like that may be determined based on one or more routine trips of the EV 102 and/or one or more prospective travel plans of the operator of the EV 102.

Upon predicting one or more points of interest that may be predicted as potential destinations of the operator of the EV 102 at one or more timeframes, the travel path module 408 may access the location log 224 stored on the data store 208 to determine the geo-location(s) of the point(s) of interest. In some configurations, the location log 224 may be updated to keep a log of locations at which the EV 102 is driven, parked, and/or charged and/or the operator visits at one or more points in time during one or more periods of time. The location log 224 may be configured to store the geo-locations of the point(s) of interest visited by the operator of the EV 102 based on the location(s) at which the EV 102 is parked which may be a pre-determined distance from one or more particular points of interest. Additionally, the travel path module 408 may access the map data 318 stored upon the data store 308 of the computing device 302 to determine the geo-locations of one or more points of interest (that may have not been previously visited by the EV 102).

In one embodiment, the travel path module 408 may also be configured to analyze the station database 314 stored upon the data store 308 of the remote server 108. As discussed, the station database 314 may include records that each pertain to particular charging stations 112 that include data that may be pre-updated and/or updated in real-time by one or more charging station entities. Such records may pertain to particular charging stations 112 and their respective geo-locations. Accordingly, the travel path module 408 may be configured to access and query the station database 314 to determine one or more charging stations 112 that may be located within a predetermined distance (e.g., 5 miles) of the current geo-location of the EV 102 and/or a predetermined distance from one or more predicted points of interest that may be visited by the EV 102.

In some configurations, the travel path module 408 may analyze additional data included within the station database 314 that may pertain to one or more pricing schemes that may be implemented by one or more charging stations that may be located within the predetermined distance of the current geo-location of the EV 102 and/or the predetermined distance from one or more predicted points of interest that may be visited by the EV 102. As discussed above, the station database 314 may also include records that pertain to particular charging stations 112 and current utilization of the charging stations 112.

The current utilization of the charging stations 112 may pertain to wait times that may be applicable with respect to the charging of the EV 102. In one embodiment, the travel path module 408 may analyze the current utilization of one or more charging stations 112 that may be associated with one or more charging stations 112 that may be located within the predetermined distance of the current geo-location of the EV 102 and/or the predetermined distance from one or more predicted points of interest that may be visited by the EV 102.

In one or more embodiments, the travel path module 408 may be configured to analyze the current geo-location of the EV 102 as determined and communicated by the location determinant module 404 in addition to the current SOC and remaining distance that the EV 102 may travel as determined and communicated by the SOC determinant module 406. The travel path module 408 may thereby be configured to determine one or more charging stations 112 that may be located within a distance that the EV 102 may be capable of traveling. The one or more charging stations 112 may be determined based on the current geo-location of the EV, the current SOC of the battery 106 of the EV 102, the remaining distance that the EV 102 may travel, the respective geo-locations of one or more predicted points of interest, and/or one or more road types (e.g., local, highway, road grades) of one or more travel pathways that may be located within a vicinity of the current geo-location of the EV 102.

In another embodiment, the travel path module 408 may be configured to determine the location of additional electric vehicles 120 that may be configured to provide charging power to charge the battery 106 of the EV 102. As discussed above, the station database 314 may include records that may pertain to one or more additional electric vehicles 120 that may be configured to provide charging power to charge the battery 106 of the EV 102 and/or may be charged by the EV 102. In one configuration, the travel path module 408 may be configured to communicate with the location determinant module 404 to utilize the communication interface 214 to communicate with a communication device (not shown) of one or more of the additional electric vehicles 120 to determine the current geo-locations of the respective additional electric vehicles 102, one or more pre-determined destinations (e.g., navigation system inputted destination) of the respective additional electric vehicles 102, a current SOC of the respective additional electric vehicles 102, and/or additional details associated with the respective additional electric vehicles 102.

In one configuration, upon determining the respective geo-locations of the additional electric vehicles 120, one or more pre-determined destinations of the additional electric vehicles 120, and/or a current SOC of the additional electric vehicles 120, the travel path module 408 may be configured to analyze respective data as determined based on communication received from the location determinant module 404. The travel path module 408 may be configured to analyze the current geo-location(s) of one or more additional electric vehicles 120, geo-location(s) of one or more pre-determined destinations of the additional electric vehicles 102, and/or may determine a charging capability of the additional electric vehicles 102.

The travel path module 408 may thereby be configured to compare the current geo-location(s) of one or more additional electric vehicles 120, geo-location(s) of one or more pre-determined destinations of the additional electric vehicles 102, and/or the charging capability of the additional electric vehicles 120 to the current geo-location of the EV 102, the current SOC of the battery 106 of the EV 102, the remaining distance that the EV 102 may travel, the respective geo-locations of one or more predicted points of interest, and/or one or more road types of one or more travel pathways that may be located within a vicinity of the current geo-location of the EV 102. This comparison may be completed to determine one or more additional electric vehicles 120 that may be located within a predetermined distance of the EV 102 and/or one or more predicted points of interest that may be visited by the EV 102.

In an exemplary embodiment, the travel path module 408 may analyze the geo-locations of the one or more charging stations 112 determined to be located within the predetermined distance of the EV 102, one or more charging stations 112 determined to be located within the predetermined distance of one or more predicted points of interest, and/or the geo-location(s) of the predicted point(s) of interest against the map data 318 stored upon the data store 308 of the computing device 302. The travel path module 408 may additionally or alternatively analyze the geo-locations of one or more additional electric vehicles 120 that are determined to be located within the predetermined distance of the EV 102, one or more additional electric vehicles 120 that are determined to be located within the predetermined distance of one or more points of interest, and/or one or more additional electric vehicles 120 that may be capable of charging the EV 102 (based on their respective SOC) against the map data 318.

As discussed above, the map data 318 may include data that pertains to geographical maps and satellite/aerial imagery of one or more locations at which the EV 102 may be located or may prospectively be located as predicted at one or more future points in time. In one embodiment, the map data 318 may be accessed by the travel path module 408 to determine one or more travel paths (e.g., roads, streets, highways, etc.) that may be utilized by the EV 102 to reach one or more predicted points of interest, one or more charging stations 112, and/or one or more additional electric vehicles 120 based on the current geo-location of the EV 102, the current SOC of the battery 106 of the EV 102, the remaining distance that the EV 102 may travel, geo-locations of one or more charging stations 112, geo-locations of one or more additional electric vehicles 102, and/or geo-locations of one or more predicted points of interest.

Upon determining one or more prospective travel paths, the travel path module 408 may analyze the one or more prospective travel paths and determine one or more charging stations 112 and/or one or more additional electric vehicles 120 that may be on or near the one or more prospective travel paths that may be utilized by the EV 102 to reach the operator's daily routines, tasks, and/or activities. The one or more charging stations 112 may be determined as charging stations 112 that may be located within the predetermined distance of the EV 102, charging stations 112 that may be reachable by the EV 102 based on the current geo-location of the EV 102, charging stations 112 that may be reachable by the EV 102 based on the current SOC of the battery 106 of the EV 102, and charging stations 112 that may be reachable by the EV 102 based on the remaining distance that the EV 102 may travel. Additionally, the one or more charging stations 112 may be determined based on charging stations 112 that may be located within a predetermined distance of the predicted point(s) of interest and/or a predetermined distance of one or more prospective travel paths.

In some configurations, the one or more additional electric vehicles 120 may also be determined based on the one or more additional electric vehicles 120 that may be currently or prospectively located within the predetermined distance of the EV 102, the predetermined distance of the predicted point(s) of interest, and/or may be capable of charging the EV 102. The travel path module 408 may thereby communicate respective data pertaining to the predicted point(s) of interest, the prospective travel paths, the determined charging station(s) 112 and/or the determined additional electric vehicles 120 to the planner presentation module 410 of the smart charge application 118.

In an exemplary embodiment, the planner presentation module 410 of the smart charge application 118 may be configured to present an electric vehicle charging planner user interface (planner user interface). The planner user interface may be presented in various formats. In one format, the planner user interface may include one or more travel paths that may be utilized by the operator to reach one or more predicted points of interest. In other words, the planner user interface may include one or more travel paths that may be presented to the operator of the EV 102 to reach from a current geo-location of the EV 102 and/or a prospective future geo-location of the EV 102 to one or more predicted points of interest that may be predicted based on one or more travel routines and/or one or more predicted travel plans.

The planner presentation module 410 may additionally present one or more of the charging stations 112 and/or one or more additional electric vehicles 120 that may be on or near the one or more prospective travel paths that may be utilized by the EV 102 to reach the operator's daily routines, tasks, and/or activities, as determined by travel path module 408. Accordingly, the planner presentation module 410 may present one or more charging stations 112 that may be located within the predetermined distance of the EV 102, may be reachable by the EV 102 based on the current geo-location of the EV 102, the current SOC of the battery 106 of the EV 102, and the remaining distance that the EV 102 may travel. Additionally, planner presentation module 410 may present one or more charging stations 112 that are located within a predetermined distance of the predicted point(s) of interest and/or a predetermined distance of one or more prospective travel paths. In some configurations, the one or more charging stations 112 may be presented with an estimated cost to charge the EV 102 based on respective pricing schemes at respective charging stations 112.

The planner presentation module 410 may additionally present one or more additional electric vehicles 120 that may be currently or prospectively located within the predetermined distance of the EV 102, the predetermined distance of the predicted point(s) of interest, and/or may be capable of charging the EV 102. In some configurations, the planner user interface 500 may be utilized by the operator to reserve vehicle to vehicle charging of the EV 102 or from the EV 102 with one or more additional electric vehicles 120 at one or more points in time.

Figure 5:
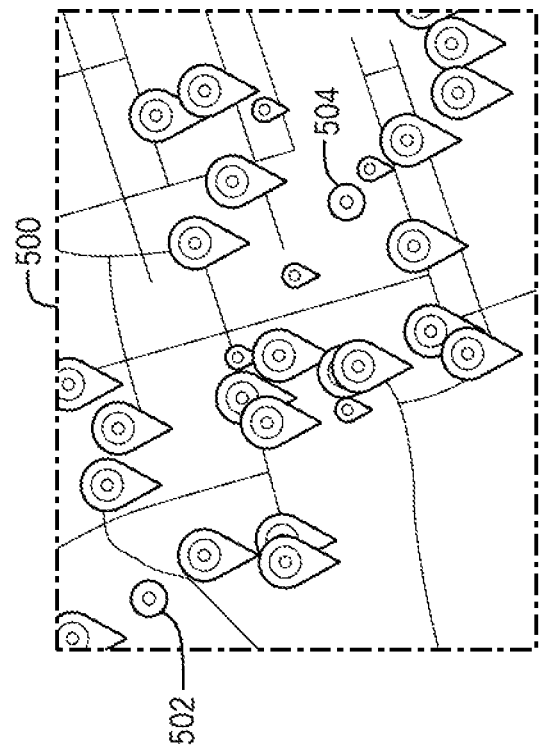
FIG. 5 is an illustrative example of a planner user interface according to an exemplary embodiment of the present disclosure.

As shown in FIG. 5, an illustrative example of a planner user interface 500 according to an exemplary embodiment of the present disclosure, the planner user interface 500 may be presented through the display 218 of the EV 102 and/or a display of the portable device 222. In one embodiment, the planner user interface 500 may be presented with one or more prospective travel pathways that may be determined as potentially usable pathways to reach one or more predicted points of interest 502, 504. In some configurations, the one or more travel pathways may be shown in various formats, colors, and/or with various designations that may indicate traffic flow, distances to one or more charging stations 112, one or more additional electric vehicles 120, and/or one or more predicted points of interest 502, 504. In additional configurations, the various designations may also or alternatively indicate time estimations to one or more charging stations 112, one or more additional electric vehicles 120, and/or one or more predicted points of interest 502, 504. In additional configurations, the one or more travel pathways may be color coded based on a ranking of recommended pathways that may be based on the pricing schemes and/or wait times associated with one or more charging stations 112.

The planner user interface 500 may also be presented in a format that may pin point the current geo-location of the EV 102, one or more prospective geo-locations of the EV 102, and/or geo-locations of one or more predicted points of interest 502, 504. Additionally, the planner user interface 500 may be presented to pin point one or more of the charging stations 112 that may be located within the predetermined distance of the EV 102, the predetermined distance of the one or more predicted points of interest 502, 504, and/or a predetermined distance of one or more prospective travel paths. In some configurations, the planer user interface 500 may additionally or alternatively be presented to pin point one or more additional electric vehicles 120 that may be currently or prospectively located within the predetermined distance of the EV 102, the predetermined distance of the predicted points of interest 502, 504, and/or may be capable of charging the EV 102.

In some configurations, the planner user interface 500 may be presented in a two-dimensional format (as shown in FIG. 5). In additional configurations, the planner user interface 500 may be converted to a three-dimensional format, a street-view format, a first person point of view format, a satellite view format, and the like based on the receipt of a respective user interface input. The planner user interface 500 may also be configured to be zoomed in or zoomed out to show a smaller area or larger area based on the adjustment of the distance of the geo-location of the EV 102 that is to be presented. Accordingly, the operator of the EV 102 may be able to view data associated with one or more charging stations 112 that may be located at a variable distance from the current geo-location of the EV 102, one or more prospective travel paths of the EV 102, and/or one or more predicted points of interest 502, 504.

The planner user interface 500 may be selectively enabled or disabled based on the receipt of a respective user interface input. In some configurations, the planner user interface 500 may be enabled based on a predetermined SOC level of the battery 106 of the EV 102 (e.g., 30% remaining SOC) and/or a user based enablement setting that may be associated with the geo-location of the EV 102 and/or a particular timeframe (e.g., particular day of the week).

In one embodiment, the operator may selectively input one or more charging stations 112 and/or charging station entities that own and/or operate particular charging stations 112 as favorites. Such favorites may be shown as highlighted or accompanied with a user interface graphic (e.g., star) that may allow the operator to easily identify them on the planner user interface 500. Additionally, the operator may selectively input one or more charging stations 112 and/or charging station entities that own and/or operate particular charging stations 112 as prohibited. Such prohibited charging stations 112 and/or charging stations 112 that are owned and/or operated by prohibited charging station entities may not be pin pointed on the planner user interface 500.

In additional embodiments, the operator may selectively input threshold preferences related to price schemes, queue/wait times, price incentives, charging types, and the like that may be utilized to pin point one or more charging stations 112 on the planner user interface 500. For example, the operator may choose a threshold queue/wait time threshold preference of "15 minutes" to only present and/or highlight charging stations 112 that may include a 15 minute or less queue wait time. Accordingly, the planner user interface 500 may be selectively customized to pin point one or more charging stations 112 that may apply with respect to the threshold preferences. The one or more charging stations 112 may be shown as highlighted or accompanied with a user interface graphic (e.g., clock symbol) that may allow the operator to easily identify them on the planner user interface 500. In other embodiments, one or more charging stations 112 that may not apply with respect to the threshold preferences may be selectively hidden based on a user interface input received by the operator. It is to be appreciated that one or more charging stations 112 may be pin pointed, highlighted, accompanied with user interface graphics, and/or hidden based on user interface inputs that may be associated with various user preferences.

In some embodiments, the planner presentation module 410 may be configured to communicate with the station computing infrastructure 116 and/or access the station database 314 to determine one or more price schemes that may be implemented by respective charging stations 112 that are presented as pin pointed. The planner presentation module 410 may be configured to present one or more price schemes and/or a summary of pricing that may be applicable to each of the respective charging stations 112 that are presented as pin pointed. The one or more charging stations 112 may be presented with an estimated cost to charge the EV 102 based on a current or prospective SOC of the EV 102 at one or more charging stations 112 based on respective price schemes. In some configurations, the planner presentation module 410 may be configured to present one or more user interface input links that may be inputted by the operator of the EV 102 to determine additional pricing information and/or trends that may be applicable to the respective charging stations 112.

In another embodiment, the planner presentation module 410 may be configured to communicate with the station computing infrastructure 116 to determine one or more queues/wait times (e.g., queues of electric vehicles to be charged) that are associated with respective charging stations 112. The one or more queues may be analyzed to determine respective wait times to charge the EV 102 if the EV 102 were to be added to a respective queue(s). Accordingly, the smart charge application 118 may present the planner user interface 500 that includes a map that may pin point one or more charging stations 112 that include queue and wait time details that may pertain to each of the respective charging stations 112.

In one configuration, the planner presentation module 410 may present a user interface input that may be associated to each of the one or more charging stations 112 that may be selected by the operator to add or remove the EV 102 from a queue of a respective charging station(s) 112. Accordingly, the planner user interface 500 may be utilized by the operator to schedule the charging of the EV 102 at one or more charging stations(s) 112 that may take place in the midst of the operator's daily routines, tasks, and/or activities.

In some configurations, the planner presentation module 410 may be configured to communicate with the station computing infrastructure 116 to determine one or more charging stations 112 that may be equipped to provide fast charging capabilities. The planner presentation module 410 may be configured to present one or more of the charging stations 112 that may be equipped to provide fast charging capabilities as pin pointed on the planner user interface. The planer user interface may be presented with respective user interface inputs that may be selected to add the EV 102 to a queue of one or more charging stations that may be configured to provide fast charging capabilities to fast charge the EV 102.

It is to be appreciated that the planner presentation module 410 may present the planner user interface in a variety of formats that may be presented with graphics detailed within one or more of the aforementioned embodiments. Accordingly, the planner user interface 500 may be presented to provide various levels of information that may pertain to one or more charging stations 112 and/or additional electric vehicles 120 that may be potentially utilized to charge the EV 102 in or more manners. It is also to be appreciated that the planner presentation module 410 may present the planner user interface 500 with additional contemplated information that may be related to charging station inventive pricing, utility costs, electric charging costs, a price per kWh of charging power that may include a dynamic value that may change over time based on a time of day, a season, a region, a time zone, etc., additional queue/wait time information, charging station/charging station entity incentives, and/or additional information that may be presented to the operator of the EV 102.

Figure 6:
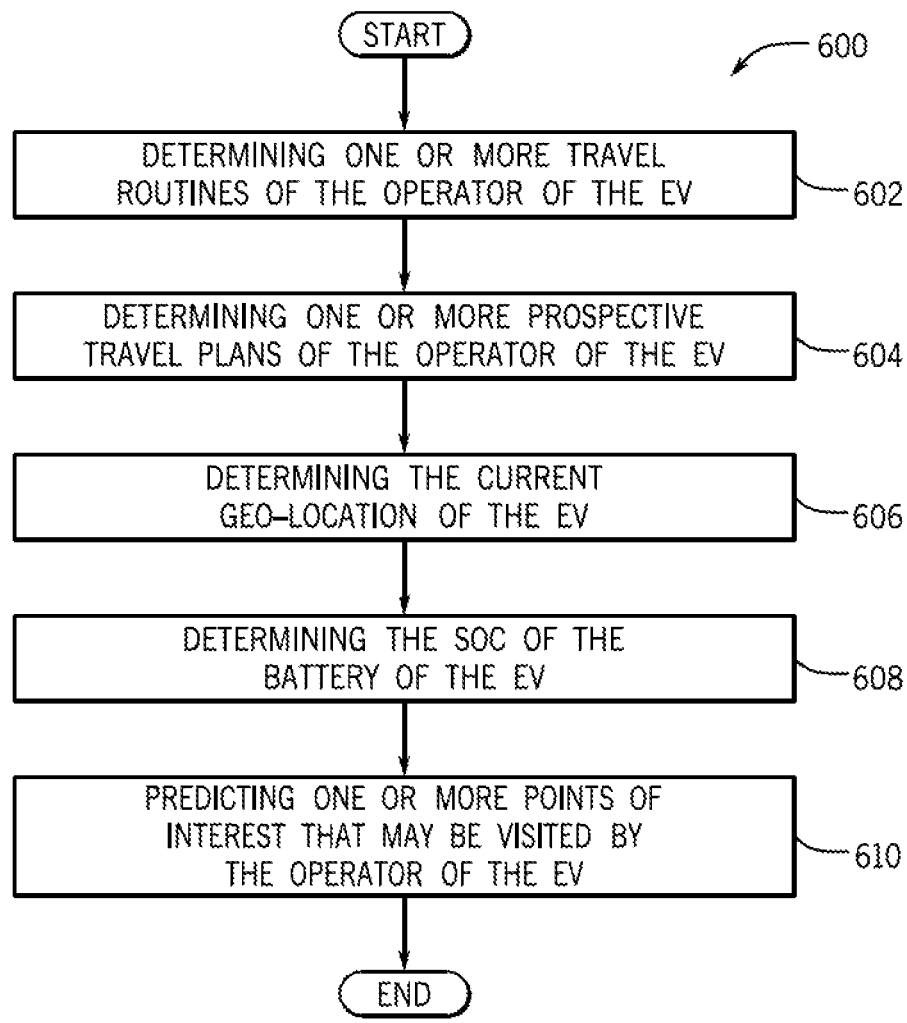
FIG. 6 is a process flow diagram of a method for predicting one or more points of interest that may be visited by the operator of an electric vehicle according to an exemplary embodiment of the present disclosure.

FIG. 6 is a process flow diagram of a method 600 for predicting one or more points of interest that may be visited by the operator of the EV 102 according to an exemplary embodiment of the present disclosure. FIG. 6 will be described with reference to the components of FIG. 1, FIG. 2, FIG. 3, and FIG. 4, through it is to be appreciated that the method 600 of FIG. 6 may be used with additional and/or alternative system components. The method 600 may begin at block 602, wherein the method 600 may include determining one or more travel routines of the operator of the EV 102.

As discussed above, the travel plan module 402 may determine one or more travel routines of the operator of the EV 102. The one or more travel routines may include one or more trips of the EV 102, tasks, and/or activities of the operator of the EV 102 that may routinely take place during a particular day, particular week, and/or one or more particular timeframes. In particular, the travel plan module 402 may be configured to access the location log 224 that may be stored on the data store 208 of the vehicle computing device 202. Upon accessing the location log 224, the travel plan module 402 may be configured to analyze the log of locations at which the EV 102 is driven, parked, and/or charged.

In one configuration, the travel plan module 402 may analyze the location log 224 to determine one or more point of interest locations that may be frequently and/or routinely traveled to by the EV 102. In particular, the travel plan module 402 may analyze point of interest data that may be stored on the data store 208 of the vehicle computing device 202 and/or the data store 308 of the remote server 108 to determine one or more points of interest locations that may be frequently and/or routinely traveled to by the EV 102. Upon analyzing the location log 224, the travel plan module 402 may be configured to determine one or more travel routines that may be followed by the operator of the EV 102.

In some configurations, the one or more travel routines may be analyzed through the neural network to provide computer/machine based/deep learning techniques to determine whether a particular trip of the EV 102 is a routine trip or non-routine trip based on the analysis of data provided by the GPS 210. In an exemplary embodiment, upon determining one or more travel routines of the operator of the EV 102, the travel plan module 402 may be configured to communicate the one or more travel routines to the travel path module 408 of the smart charge application 118.

The method 600 may proceed to block 604, wherein the method 600 may include determining one or more prospective travel plans of the operator of the EV 102. As discussed above, the travel plan module 402 may determine one or more prospective travel plans of the operator of the EV 102. In one embodiment, the travel plan module 402 may be configured to access the operator dataset 226 to determine one or more prospective travel plans of the operator of the EV 102 based on one or more applications that may be executed on the portable device 222 used by the operator of the EV 102. As discussed above, the operator dataset 226 stored upon the data store 208 of the vehicle computing device 202 may be populated with one or more data points that may be determined based on data that is received from the portable device 222.

The travel plan module 402 may be configured to analyze the one or more data points that may be determined based on the data that is received and populated from such applications and may be configured to determine one or more prospective travel plans that may be followed by the operator of the EV 102 that may be based on task lists, vendor reservations, travel reservations, shopping lists, notes, and the like. In an exemplary embodiment, upon determining one or more prospective travel plans of the operator of the EV 102, the travel plan module 402 may be configured to communicate the one or more prospective travel plans to the travel path module 408 of the smart charge application 118.

The method 600 may proceed to block 606, wherein the method 600 may include determining the current geo-location of the EV 102. In an exemplary embodiment, the location determinant module 404 may be configured to communicate with the GPS 210 of the EV 102 to determine the current geo-location of the EV 102 at one or more points in time. In some embodiments, the location determinant module 404 may be configured to store one or more geo-locations of the EV 102 as determined at one or more points in time within the data store 208 of the vehicle computing device 202 and/or the data store 308 of the remote server 108. The location determinant module 404 may communicate the current geo-location of the EV 102 to the travel path module 408 of the smart charge application 118.

The method 600 may proceed to block 608, wherein the method 600 may include determining the SOC of the battery 106 of the EV 102. As discussed above, the SOC determinant module 406 may be configured to determine the current SOC of the battery 106 of the EV 102. In one configuration, the SOC determinant module 406 may be configured to communicate with the processor 204 of the vehicle computing device 202 to determine the current SOC of the battery 106 of the EV 102. In one embodiment, the processor 204 may be configured to communicate with a microprocessor (not shown) that may be included as part of electrical circuitry of the battery 106 to determine a current SOC of the battery 106. The SOC determinant module 406 may be additionally configured to analyze the current geo-location of the EV 102 and determine a remaining distance that the EV 102 is capable of traveling. The remaining distance may be determined based on analyzing the current SOC of the battery 106, an average speed of the EV 102, and/or one or more road types (e.g., local, highway, road grades) that may be located within a vicinity of the current geo-location of the EV 102. Upon determining the current SOC and remaining distance that the EV 102 may travel at the average speed of the EV 102, the SOC determinant module 406 may communicate respective data to the travel path module 408 of the smart charge application 118.

The method 600 may proceed to block 610, wherein the method 600 may include predicting one or more points of interest that may be visited by the operator of the EV 102. In one embodiment, the travel path module 408 may analyze the current geo-location of the EV 102 at one or more points in time with respect a particular timeframe of utilization of the EV 102 (determined at block 606) in addition to the current SOC and remaining distance that the EV 102 may travel at the average speed of the EV 102 (determined at block 608). Additionally, the travel path module 408 may analyze one or more routine trips of the operator of the EV 102 (determined at block 602) and one or more prospective travel plans of the operator of the EV 102 (determined at block 604).

The travel path module 408 may thereby predict one or more points of interest as potential destinations of the operator of the EV 102 during the course of one or more particular timeframes (e.g., days, hours). The one or more predicted points of interest may be based on a particular timeframe(s) of use of the EV 102, the current geo-location of the EV 102, the current SOC of the EV 102, the remaining distance that the EV 102 may travel at the average speed of the EV 102. Additionally, the one or more predicted points of interest may be predicted as potential destinations of the EV 102 based on analysis of the one or more travel routines and/or the one or more prospective travel plans as determined by the travel plan module 402.

In one embodiment, upon predicting one or more points of interest that may be predicted as potential destinations of the operator of the EV 102 at one or more timeframes, the travel path module 408 may access the location log 224 stored on the data store 208 to determine the geo-location(s) of the point(s) of interest. Additionally, the travel path module 408 may access the map data 318 stored upon the data store 308 of the computing device 302 to determine the geo-locations of one or more points of interest (that may have not been previously visited by the EV 102).

Figure 7:
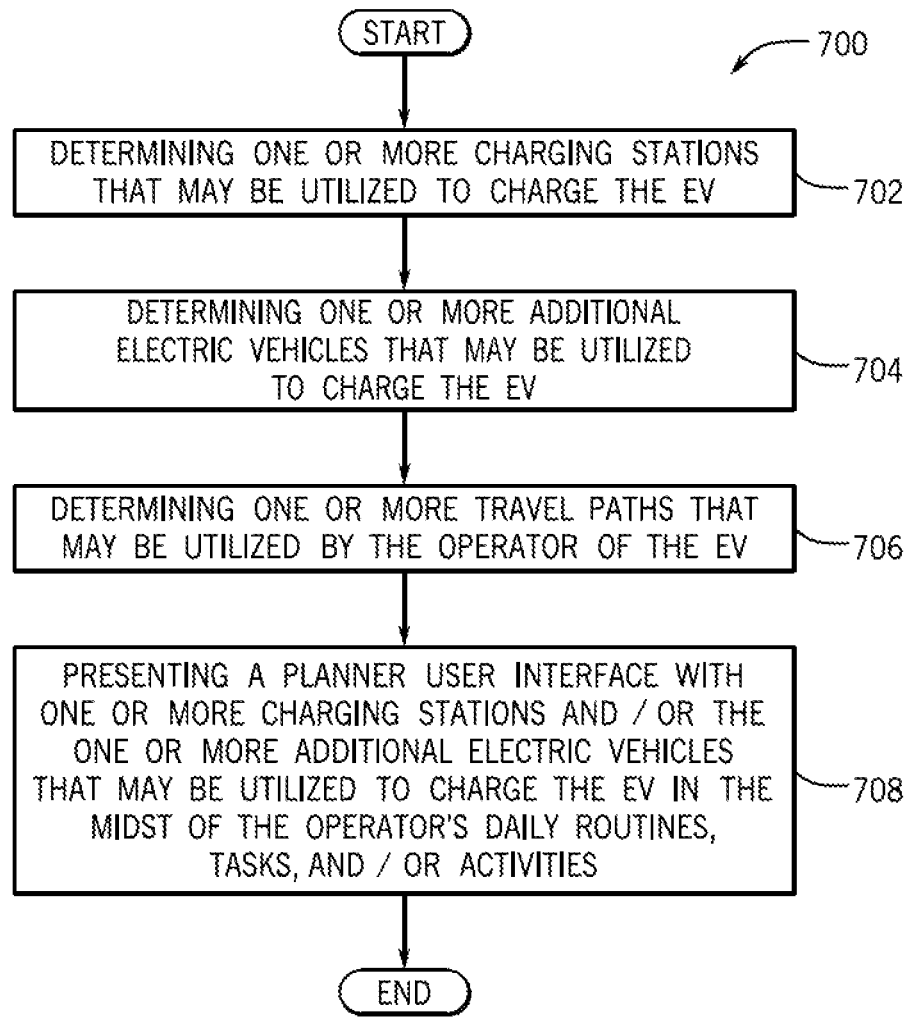
FIG. 7 is a process flow diagram of a method of presenting a planner user interface with one or more charging stations and one or more additional electric vehicles 120 that may be utilized to provide the operator of the EV with charging options to charge the EV in the midst of the operator's daily routines, tasks, and/or activities according to an exemplary embodiment of the present disclosure.

FIG. 7 is a process flow diagram of a method 700 of presenting a planner user interface with one or more charging stations 112 and one or more additional electric vehicles 120 that may be utilized to provide the operator of the EV 102 with charging options to charge the EV 102 in the midst of the operator's daily routines, tasks, and/or activities according to an exemplary embodiment of the present disclosure. FIG. 7 will be described with reference to the components of FIG. 1, FIG. 2, FIG. 3, and FIG. 4, through it is to be appreciated that the method 700 of FIG. 7 may be used with additional and/or alternative system components. The method 700 may begin at block 702, wherein the method 700 may include determining one or more charging stations 112 that may be utilized to charge the EV 102.

In one embodiment, the travel path module 408 may be configured to analyze the station database 314 stored upon the data store 308 of the remote server 108. As discussed, the station database 314 may include records that each pertain to particular charging stations 112 that include data that may be pre-updated and/or updated in real-time by one or more charging station entities. Such records may pertain to particular charging stations 112 and their respective geo-locations. Accordingly, the travel path module 408 may be configured to access and query the station database 314 to determine one or more charging stations 112 that may be located within a predetermined distance (e.g., 5 miles) of the current geo-location of the EV 102 and/or a predetermined distance from respective geo-locations of one or more predicted points of interest that may be visited by the EV 102.

In one or more embodiments, the travel path module 408 may be configured to analyze the current geo-location of the EV 102 as determined and communicated by the location determinant module 404. The travel path module 408 may also be configured to analyze the current SOC and remaining distance that the EV 102 may travel as determined and communicated by the SOC determinant module 406. The travel path module 408 may thereby be configured to determine one or more charging stations 112 that may be located within a distance that the EV 102 may be capable of traveling. The one or more charging stations 112 may be determined based on the current geo-location of the EV, the current SOC of the battery 106 of the EV 102, the remaining distance that the EV 102 may travel, the respective geo-locations of one or more predicted points of interest, and/or one or more road types (e.g., local, highway, road grades) of one or more travel pathways that may be located within a vicinity of the current geo-location of the EV 102.

The method 700 may proceed to block 704, wherein the method 700 may include determining one or more additional electric vehicles 120 that may be utilized to charge the EV 102. As discussed above, the station database 314 may include records that may pertain to one or more additional electric vehicles 120 that may be configured to provide charging power to charge the battery 106 of the EV 102 and/or may be charged by the EV 102. In one configuration, the travel path module 408 may be configured to communicate with the location determinant module 404 to utilize the communication interface 214 to communicate with a communication device (not shown) of one or more of the additional electric vehicles 120 to determine the current geo-locations of the respective additional electric vehicles 102, one or more pre-determined destinations (e.g., navigation system inputted destination) of the respective additional electric vehicles 102, a current SOC of the respective additional electric vehicles 102, and/or additional details associated with the respective additional electric vehicles 102.

In one configuration, upon determining the respective geo-locations of the additional electric vehicles 120, one or more pre-determined destinations of the additional electric vehicles 120, and/or a current SOC of the additional electric vehicles 120, the travel path module 408 may be configured to analyze respective data as determined based on communication received from the location determinant module 404. The travel path module 408 may be configured to analyze the current geo-location(s) of one or more additional electric vehicles 120, geo-location(s) of one or more pre-determined destinations of the additional electric vehicles 102, and/or may determine a charging capability of the additional electric vehicles 102.

The travel path module 408 may thereby be configured to compare the current geo-location(s) of one or more additional electric vehicles 120, geo-location(s) of one or more pre-determined destinations of the additional electric vehicles 102, and/or the charging capability of the additional electric vehicles 120 to the current geo-location of the EV 102, the current SOC of the battery 106 of the EV 102, the remaining distance that the EV 102 may travel, the respective geo-locations of one or more predicted points of interest, and/or one or more road types of one or more travel pathways that may be located within a vicinity of the current geo-location of the EV 102 to determine one or more additional electric vehicles 120 that may be utilized to charge the EV 102.

The method 700 may proceed to block 706, wherein the method 700 may include determining one or more prospective travel paths that may be utilized by the operator of the EV 102. In an exemplary embodiment, the travel path module 408 may analyze the geo-locations of the one or more charging stations 112 determined to be located within the predetermined distance of the EV 102, one or more charging stations 112 determined to be located within the predetermined distance of one or more predicted points of interest, and/or the geo-location(s) of the predicted point(s) of interest against the map data 318 stored upon the data store 308 of the computing device 302. The travel path module 408 may additionally or alternatively analyze the geo-locations of one or more additional electric vehicles 120 that are determined to be located within the predetermined distance of the EV 102, one or more additional electric vehicles 120 that are determined to be located within the predetermined distance of one or more points of interest, and/or one or more additional electric vehicles 120 that may be capable of charging the EV 102 (based on their respective SOC) against the map data 318.

In particular, the map data 318 may be accessed by the travel path module 408 to determine one or more travel paths (e.g., roads, streets, highways, etc.) that may be utilized by the EV 102 to reach one or more predicted points of interest, one or more charging stations 112, and/or one or more additional electric vehicles 120 based on the current geo-location of the EV 102, the current SOC of the battery 106 of the EV 102, the remaining distance that the EV 102 may travel, geo-locations of one or more charging stations 112, geo-locations of one or more additional electric vehicles 102, and/or geo-locations of one or more predicted points of interest (as determined by the travel path module 408).

In one embodiment, upon determining one or more prospective travel paths, the travel path module 408 may analyze the one or more prospective travel paths and one or more charging stations that may be utilized to charge the EV 102 (as determined at block 702) to further determine one or more charging stations 112 that may be on or near the one or more prospective travel paths that may be utilized by the EV 102 to reach the operator's daily routines, tasks, and/or activities. The one or more charging stations 112 may be determined based on charging stations 112 that may be located within the predetermined distance of the EV 102, may be reachable by the EV 102 based on the current geo-location of the EV 102, the current SOC of the battery 106 of the EV 102, and the remaining distance that the EV 102 may travel. Additionally, the one or more charging stations 112 may be determined based on a predetermined distance of the predicted point(s) of interest and/or a predetermined distance of one or more prospective travel paths.

In some configurations, the travel path module 408 may additionally or alternatively analyze the one or more prospective travel paths and one or more additional electric vehicles 120 that may be utilized to charge the EV 102 (as determined at block 704) to further determine one or more additional electric vehicles 120 that may be currently or prospectively located within the predetermined distance of the EV 102, the predetermined distance of the predicted point(s) of interest, and/or may be capable of charging the EV 102. The travel path module 408 may thereby communicate respective data pertaining to the predicted point(s) of interest, the prospective travel paths, the determined charging station(s) 112 and/or the determined additional electric vehicles 120 to the planner presentation module 410 of the smart charge application 118.

The method 700 may proceed to block 708, wherein the method 700 may include presenting a planner user interface with one or more charging stations and/or the one or more additional electric vehicles 120 that may be utilized to charge the EV 102 in the midst of the operator's daily routines, tasks, and/or activities. In an exemplary embodiment, the planner presentation module 410 of the smart charge application 118 may be configured to present the planner user interface. As discussed above, the planner user interface may include one or more prospective travel paths that may be presented to the operator of the EV 102 to reach from a current geo-location of the EV 102 and/or a prospective future geo-location of the EV 102 to one or more predicted points of interest that may be predicted based on one or more travel routines and/or one or more predicted travel plans.

The planner presentation module 410 may additionally present one or more of the charging stations 112 and/or one or more additional electric vehicles 120 that may be on or near the one or more prospective travel paths that may be utilized by the EV 102 to complete the operator's daily routines, tasks, and/or activities, as determined by travel path module 408. Accordingly, the planner presentation module 410 may present one or more charging stations 112 that may be located within the predetermined distance of the EV 102, may be reachable by the EV 102 based on the current geo-location of the EV 102, the current SOC of the battery 106 of the EV 102, and the remaining distance that the EV 102 may travel. Additionally, planner presentation module 410 may present one or more charging stations 112 that are located within a predetermined distance of the predicted point(s) of interest and/or a predetermined distance of one or more prospective travel paths. In some configurations, the one or more charging stations 112 may be presented with an estimated cost to charge the EV 102 based on respective pricing schemes at respective charging stations 112. In additional configurations, the planner user interface 500 may be utilized by the operator to reserve charging of the EV 102 at one or more charging stations 112 at one or more points in time.

The presentation module 410 may additionally present one or more additional electric vehicles 120 that may be currently or prospectively located within the predetermined distance of the EV 102, the predetermined distance of the predicted point(s) of interest, and/or may be capable of charging the EV 102. In some configurations, the planner user interface 500 may be utilized by the operator to reserve vehicle to vehicle charging of the EV 102 or from the EV 102 with one or more additional electric vehicles 120 at one or more points in time.

As discussed, it is to be appreciated that the planner presentation module 410 may present the planner user interface in a variety of formats that may be presented with graphics detailed within one or more of the aforementioned embodiments. Accordingly, the planner user interface 500 may be presented to provide various levels of information that may pertain to one or more charging stations 112 and/or additional electric vehicles 120 that may be potentially utilized to charge the EV 102 in or more manners. Accordingly, the operator may be presented with one or more charging options to charge the EV 102 in the midst of the operator's daily routines, tasks, and/or activities.

Figure 8:
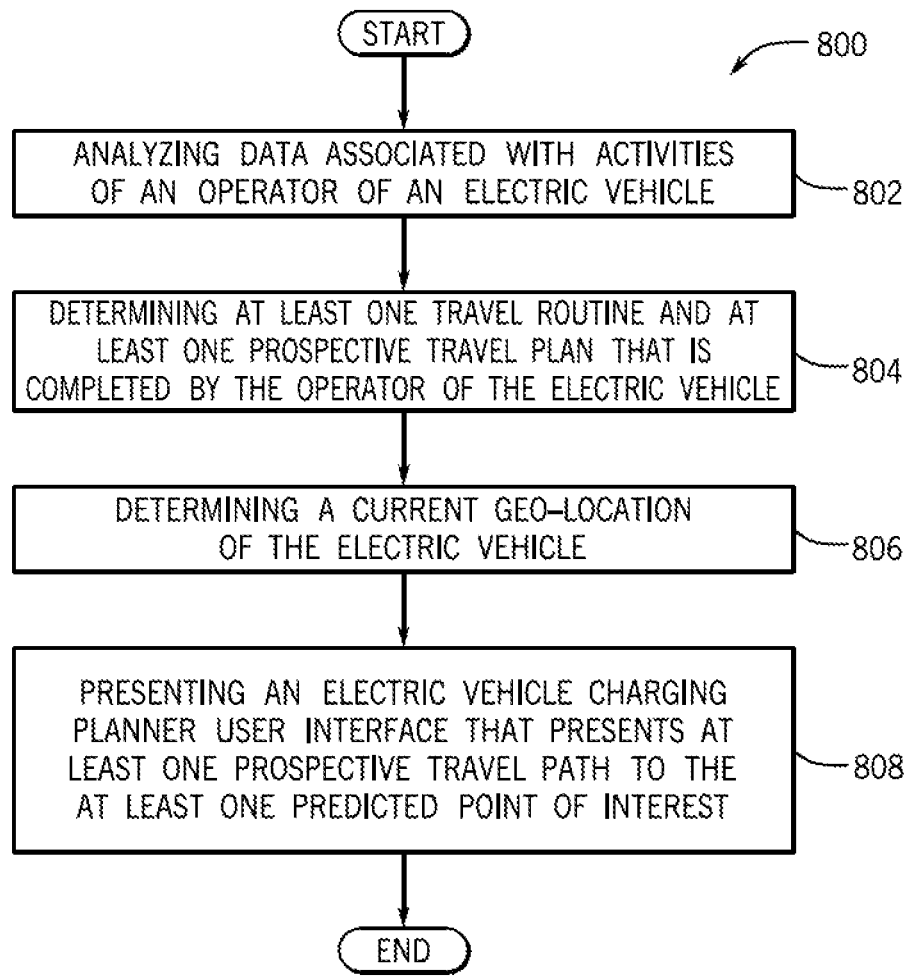
FIG. 8 is a process flow diagram of a method for providing charging options based on electric vehicle operator daily activities according to an exemplary embodiment of the present disclosure.

FIG. 8 is a process flow diagram of a method 800 for providing charging options based on electric vehicle operator daily activities according to an exemplary embodiment of the present disclosure. FIG. 8 will be described with reference to the components of FIG. 1, FIG. 2, FIG. 3, and FIG. 4, through it is to be appreciated that the method 800 of FIG. 8 may be used with additional and/or alternative system components. The method 800 may begin at block 802, wherein the method 800 may include analyzing data associated with daily activities of an operator of an electric vehicle 102.

The method 800 may proceed to block 804, wherein the method 800 may include determining at least one travel routine and at least one prospective travel plan that is completed by the operator of the electric vehicle based on the daily activities.

The method 800 may proceed to block 806, wherein the method 800 may include determining a current geo-location of the electric vehicle 102. In one embodiment, the current geo-location of the electric vehicle 102, the at least one travel routine and the at least one prospective travel plan are analyzed to determine at least one predicted point of interest. The method 800 may proceed to block 808, wherein the method 800 may include presenting an electric vehicle charging planner user interface that presents at least one prospective travel path to the at least one predicted point of interest. At least one charging station 112 that is usable to charge the electric vehicle 102 during the completion of the daily activities of the operator of the electric vehicle 102 is presented through the electric vehicle charging planner user interface.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing charging options based on electric vehicle operator daily activities, comprising:

analyzing data associated with daily activities of an operator of an electric vehicle;

determining at least one travel routine and at least one prospective travel plan that is completed by the operator of the electric vehicle based on the daily activities, wherein the at least one travel routine is analyzed through a neural network to determine whether a particular trip of the electric vehicle is a routine trip or a non-routine trip;

determining a current geo-location of the electric vehicle, wherein the current geo-location of the electric vehicle, the at least one travel routine determined as a routine trip, the at least one prospective travel plan, and a remaining distance that the electric vehicle is capable of traveling based on a state of charge of a battery of the electric vehicle are analyzed to determine at least one predicted point of interest, wherein at least one prospective travel path of the electric vehicle is determined based on the current geo-location of the electric vehicle, the remaining distance that the electric vehicle is capable of traveling, and the at least one predicted point of interest; and presenting on an electric vehicle charging planner user interface that presents the at least one prospective travel path to the at least one predicted point of interest, wherein at least one charging station and at least one additional electric vehicle, when the at least one additional electric vehicle is available, that are usable to charge the electric vehicle during completion of the daily activities of the operator of the electric vehicle is presented through the electric vehicle charging planner user interface.

2. The computer-implemented method of claim 1, wherein analyzing the data associated with the daily activities of the operator includes accessing a location log that includes a log of locations at which the electric vehicle is driven, parked, or charged.

3. The computer-implemented method of claim 2, wherein determining the at least one travel routine includes analyzing the log of locations stored upon the location log to determine trips of the electric vehicle, tasks of the operator of the electric vehicle, and activities of the operator of the electric vehicle that routinely take place during at least one particular timeframe.

4. The computer-implemented method of claim 2, wherein determining the at least one travel routine includes determining at least one point of interest location that is frequently or routinely traveled to by the electric vehicle to determine the at least one travel routine.

5. The computer-implemented method of claim 2, wherein determining the at least one prospective travel plan includes accessing an operator dataset to analyze data points that are determined based on data that is received and populated by at least one application that pertains to daily activities of the operator of the electric vehicle and that is executed by a portable device used by the operator of the electric vehicle.

6. The computer-implemented method of claim 5, wherein determining the at least one prospective travel plan includes analyzing at least one of: a task list, a vendor reservation, a travel reservation, a shopping list, and a note that are included within the data points to determine the at least one prospective travel plan of the operator of the electric vehicle.

7. The computer-implemented method of claim 1, wherein presenting on the electric vehicle charging planner user interface that presents the at least one prospective travel path includes presenting information related to the at least one charging station that includes charging rates, charging infrastructure, charging queues, and pricing incentives.

8. The computer-implemented method of claim 1, wherein presenting on the electric vehicle charging planner user interface that presents the at least one prospective travel path includes determining the at least one charging station that is usable to charge the electric vehicle based on the current geo-location of the electric vehicle, the state of charge of the battery of the electric vehicle, and a geo-location of the at least one predicted point of interest.

9. The computer-implemented method of claim 8, wherein presenting on the electric vehicle charging planner user interface that presents the at least one prospective travel path includes presenting the at least one charging station as pin pointed on or near the at least one prospective travel path.

10. A system for providing charging options based on electric vehicle operator daily activities, comprising:
a memory storing instructions when executed by a processor cause the processor to:
analyze data associated with daily activities of an operator of an electric vehicle;
determine at least one travel routine and at least one prospective travel plan that is completed by the operator of the electric vehicle based on the daily activities, wherein the at least one travel routine is analyzed through a neural network to determine whether a particular trip of the electric vehicle is a routine trip or a non-routine trip;
determine a current geo-location of the electric vehicle, wherein the current geo-location of the electric vehicle, the at least one travel routine determined as a routine trip, the at least one prospective travel plan, and a remaining distance that the electric vehicle is capable of traveling based on a state of charge of a battery of the electric vehicle are analyzed to determine at least one predicted point of interest, wherein at least one prospective travel path of the electric vehicle is determined based on the current geo-location of the electric vehicle, the remaining distance that the electric vehicle is capable of traveling, and the at least one predicted point of interest; and
present on an electric vehicle charging planner user interface that presents the at least one prospective travel path to the at least one predicted point of interest, wherein at least one charging station and at least one additional electric vehicle, when the at least one additional electric vehicle is available, that are usable to charge the electric vehicle during completion of the daily activities of the operator of the electric vehicle is presented through the electric vehicle charging planner user interface.

11. The system of claim 10, wherein analyzing the data associated with the daily activities of the operator includes accessing a location log that includes a log of locations at which the electric vehicle is driven, parked, or charged.

12. The system of claim 11, wherein determining the at least one travel routine includes analyzing the log of locations stored upon the location log to determine trips of the electric vehicle, tasks of the operator of the electric vehicle, and activities of the operator of the electric vehicle that routinely take place during at least one particular timeframe.

13. The system of claim 11, wherein determining the at least one travel routine includes determining at least one point of interest location that is frequently or routinely traveled to by the electric vehicle to determine the at least one travel routine.

14. The system of claim 11, wherein determining the at least one prospective travel plan includes accessing an operator dataset to analyze data points that are determined based on data that is received and populated by at least one application that pertains to daily activities of the operator of the electric vehicle and that is executed by a portable device used by the operator of the electric vehicle.

15. The system of claim 14, wherein determining the at least one prospective travel plan includes analyzing at least one of: a task list, a vendor reservation, a travel reservation, a shopping list, and a note that are included within the data points to determine the at least one prospective travel plan of the operator of the electric vehicle.

16. The system of claim 10, wherein presenting on the electric vehicle charging planner user interface that presents the at least one prospective travel path includes presenting information related to the at least one charging station that includes charging rates, charging infrastructure, charging queues, and pricing incentives.

17. The system of claim 10, wherein presenting on the electric vehicle charging planner user interface that presents the at least one prospective travel path includes determining the at least one charging station that is usable to charge the electric vehicle based on the current geo-location of the electric vehicle, the state of charge of the battery of the electric vehicle, and a geo-location of the at least one predicted point of interest.

18. The system of claim 17, wherein presenting on the electric vehicle charging planner user interface that presents the at least one prospective travel path includes presenting the at least one charging station as pin pointed on or near the at least one prospective travel path.

19. A non-transitory computer readable storage medium storing instructions that when executed by a computer, which includes a processor perform a method, the method comprising:
analyzing data associated with daily activities of an operator of an electric vehicle;
determining at least one travel routine and at least one prospective travel plan that is completed by the operator of the electric vehicle based on the daily activities, wherein the at least one travel routine is analyzed through a neural network to determine whether a particular trip of the electric vehicle is a routine trip or a non-routine trip;

determining a current geo-location of the electric vehicle, wherein the current geo-location of the electric vehicle, the at least one travel routine determined as a routine trip, the at least one prospective travel plan, and a remaining distance that the electric vehicle is capable of traveling based on a state of charge of a battery of the electric vehicle are analyzed to determine at least one predicted point of interest, wherein at least one prospective travel path of the electric vehicle is determined based on the current geo-location of the electric vehicle, the remaining distance that the electric vehicle is capable of traveling, and the at least one predicted point of interest; and presenting on an electric vehicle charging planner user interface that presents the at least one prospective travel path to the at least one predicted point of interest, wherein at least one charging station and at least one additional electric vehicle, when the at least one additional electric vehicle is available, that are usable to charge the electric vehicle during completion of the daily activities of the operator of the electric vehicle is presented through the electric vehicle charging planner user interface.

20. The non-transitory computer readable storage medium of claim 19, wherein presenting on the electric vehicle charging planner user interface that presents the at least one prospective travel path includes presenting the at least one charging station as pin pointed on or near the at least one prospective travel path.

\* \* \* \* \*